(12) United States Patent
Che et al.

(10) Patent No.: US 11,210,795 B2
(45) Date of Patent: Dec. 28, 2021

(54) PEDESTRIAN FLOW FUNNEL GENERATION METHOD AND APPARATUS, STORAGE MEDIUM AND ELECTRONIC DEVICE

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Guangfu Che, Beijing (CN); Yu Chen, Beijing (CN); Shan An, Beijing (CN); Qiang Liu, Beijing (CN); Zhi Weng, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

(*) Notice: Subject to any disclaimer, the term of this patent is extended or adjusted under 35 U.S.C. 154(b) by 0 days.

(21) Appl. No.: 16/758,958

(22) PCT Filed: Oct. 24, 2018

(86) PCT No.: PCT/CN2018/111713
§ 371 (c)(1),
(2) Date: Apr. 24, 2020

(87) PCT Pub. No.: WO2019/080881
PCT Pub. Date: May 2, 2019

(65) Prior Publication Data
US 2020/0349720 A1    Nov. 5, 2020

(30) Foreign Application Priority Data

Oct. 24, 2017    (CN) .......................... 201711002265.5

(51) Int. Cl.
*G06T 7/246*    (2017.01)
*G06K 9/00*    (2006.01)
(Continued)

(52) U.S. Cl.
CPC .......... *G06T 7/248* (2017.01); *G06K 9/00362* (2013.01); *G06K 9/00778* (2013.01);
(Continued)

(58) Field of Classification Search
None
See application file for complete search history.

(56) References Cited

U.S. PATENT DOCUMENTS

| 7,492,924 | B2 | 2/2009 | Rodyushkin et al. | |
| 2014/0139660 | A1* | 5/2014 | Zhu .......................... | G06K 9/48 348/143 |

(Continued)

FOREIGN PATENT DOCUMENTS

| CN | 101777114 A | 7/2010 |
| CN | 101877058 A | 11/2010 |

(Continued)

OTHER PUBLICATIONS

The ISR dated Jan. 24, 2019 by the WIPO.
(Continued)

*Primary Examiner* — Leon Flores
(74) *Attorney, Agent, or Firm* — Qinghong Xu

(57) ABSTRACT

The disclosure relates to the technical field of data processing. Disclosed are a pedestrian flow funnel generation method and apparatus, a storage medium and an electronic device. The method can comprise: acquiring a current frame of image, and tracking and updating, according to a multi-target tracking algorithm, a head and shoulder area in a tracking sequence set in the current frame of image; acquiring, according to a head and shoulder recognition model, a head and shoulder area in the current frame of image, and updating, according to the head and shoulder area in the current frame of image, the tracking sequence set; analysing a motion track of each head and shoulder area in the tracking (Continued)

S1 — obtaining a current frame image, and tracking and updating head-shoulder regions in a tracking sequence set in the current frame image according to a multi-target tracking algorithm S2 — obtaining the head-shoulder region in the current frame image according to a head-shoulder recognition model, and updating the tracking sequence set according to the head-shoulder regions in the current frame image S3 — analyzing a motion trajectory of each head-shoulder region in the tracking sequence set to count the pedestrians, and when the current frame image is a last frame image, generating the pedestrian flow funnel based on a counting result of the pedestrians sequence set so as to count pedestrians, and when the current frame of image is the last frame of image, generating a pedestrian flow funnel based on a counting result of pedestrians.

16 Claims, 9 Drawing Sheets

(51) Int. Cl.
 *G06K 9/03* (2006.01)
 *G06K 9/62* (2006.01)
 *G06N 3/04* (2006.01)
 *G06N 3/08* (2006.01)

(52) U.S. Cl.
 CPC ............ *G06K 9/03* (2013.01); *G06K 9/6215* (2013.01); *G06K 9/6256* (2013.01); *G06N 3/04* (2013.01); *G06N 3/08* (2013.01); *G06K 2009/6213* (2013.01); *G06T 2207/10016* (2013.01); *G06T 2207/20081* (2013.01); *G06T 2207/20084* (2013.01); *G06T 2207/30196* (2013.01); *G06T 2207/30232* (2013.01); *G06T 2207/30241* (2013.01); *G06T 2207/30242* (2013.01)

(56) References Cited

U.S. PATENT DOCUMENTS

| | | | | |
|---|---|---|---|---|
| 2017/0178345 | A1* | 6/2017 | Pham | ...................... G06T 7/277 |
| 2018/0189557 | A1* | 7/2018 | Tang | ................... G06K 9/00362 |

FOREIGN PATENT DOCUMENTS

| | | | |
|---|---|---|---|
| CN | 103021059 | A | 4/2013 |
| CN | 103049787 | A | 4/2013 |
| CN | 103425967 | A | 12/2013 |
| CN | 106203513 | A | 12/2016 |
| CN | 106530340 | A | 3/2017 |
| CN | 107066990 | A | 8/2017 |
| JP | 2009211311 | A | 9/2009 |
| JP | 2017097510 | A | 6/2017 |
| JP | 2017123024 | A | 7/2017 |
| KR | 20170032033 | A | 3/2017 |

OTHER PUBLICATIONS

The CN1OA dated Jun. 2, 2020 by the CNIPA.
The 1st Office Action dated Jul. 6, 2021 for JP patent application No. 2020-520032.
Notice of Allowance dated Jun. 17, 2021 for CN patent application No. 201711002265.5.

* cited by examiner changing the head-shoulder region that has not been updated by the head-shoulder regions obtained from each frame image in the images with the first preset number of frames from the tracking state to an abnormal state, when there is a head-shoulder region in a tracking state in the tracking sequence set that has not been updated by the head-shoulder regions obtained from each frame image in images with a first preset number of frames ⟶ S31 deleting the head-shoulder region in the abnormal state in the tracking sequence set that has been matched successfully in the images with the second preset number of frames, when there is a head-shoulder region in the abnormal state in the tracking sequence set that has not been matched successfully in the images with the second preset number of frames ⟶ S32

FIG.1d

PEDESTRIAN FLOW FUNNEL GENERATION METHOD AND APPARATUS, STORAGE MEDIUM AND ELECTRONIC DEVICE

CROSS-REFERENCE

The present application is based upon International Application No. PCT/CN 2018/111713, filed on Oct. 24, 2018, which is based upon and claims the priority to the Chinese Patent Application NO. 201711002265.5, entitled "METHOD AND APPARATUS FOR GENERATING PEDESTRIAN FLOW FUNNEL, STORAGE MEDIUM, AND ELECTRONIC DEVICE", filed on Oct. 24, 2017, the entire contents of which are hereby incorporated by reference as a part of the present application.

TECHNICAL FIELD

The present disclosure relates to the technical field of data processing, and in particular, to a method and an apparatus for generating a pedestrian flow funnel, a storage medium, and an electronic device.

BACKGROUND

With the continuous progress of society, the application range of video surveillance systems is getting wider and wider. Surveillance cameras are often installed at entrances and exits of supermarkets, shopping malls, stadiums, and airport stations, so that security personnel and managers can monitor the entrances and exits of these places. On the other hand, the flow of people in and out of supermarkets, shopping malls, stadiums, and airport stations is of great significance to operators or managers of the above-mentioned places. The flow of people refers to the number of people moving in a certain direction, which particularly refers to the number of people moving along in/out directions.

In the existing video surveillance, statistics for the flow of people are mainly realized by manual counting of the monitoring staff, but the accuracy may be low, and the labor cost is high.

It should be noted that the information disclosed in the Background section above is only for enhancing the understanding of the background of the present disclosure, and thus may include information that does not constitute prior art known to those of ordinary skill in the art.

SUMMARY

An object of the present disclosure is to provide a method and an apparatus for generating a pedestrian flow funnel, a storage medium, and an electronic device, so as to at least to some extent overcome one or more problems caused by the limitations and defects of the related art.

According to an aspect of the present disclosure, a method for generating a pedestrian flow funnel is provided, including:

obtaining a current frame image, and tracking and updating head-shoulder regions in a tracking sequence set in the current frame image according to a multi-target tracking algorithm;

obtaining the head-shoulder region in the current frame image according to a head-shoulder recognition model, and updating the tracking sequence set according to the head-shoulder regions in the current frame image; and analyzing a motion trajectory of each head-shoulder region in the tracking sequence set to count pedestrians, and when the current frame image is a last frame image, generating the pedestrian flow funnel based on a counting result of the pedestrians.

In an exemplary embodiment of the present disclosure, before obtaining a current frame image, the method further includes:

Obtaining a first frame image, and obtaining head-shoulder regions in the first frame image according to the head-shoulder recognition model, and initializing the tracking sequence set through the head-shoulder regions.

In an exemplary embodiment of the present disclosure, the method further includes:

identifying age groups and gender of each head-shoulder region in the tracking sequence set according to a gender-age recognition model.

In an exemplary embodiment of the present disclosure, generating the pedestrian flow funnel based on a counting result of the pedestrians includes:

generating the pedestrian flow funnel based on the counting result of the pedestrians and in combination with the age groups and gender of each head-shoulder region in the tracking sequence set.

In an exemplary embodiment of the present disclosure, tracking and updating head-shoulder regions in a tracking sequence set in the current frame image according to a multi-target tracking algorithm includes:

tracking and updating the head-shoulder regions in the tracking sequence set in the current frame image according to a kernel correlation filter tracking algorithm, respectively.

In an exemplary embodiment of the present disclosure, tracking and updating the head-shoulder regions in the tracking sequence set in the current frame image according to a kernel correlation filter tracking algorithm respectively includes:

obtaining candidate tracking targets corresponding to each head-shoulder region in the tracking sequence set in the current frame image based on a position of each head-shoulder region in the tracking sequence set in a previous frame image, respectively;

correspondingly calculating response values of the candidate tracking target corresponding to each head-shoulder region according to a tracker corresponding to each head-shoulder region, respectively;

determining the candidate tracking target with a largest response value among the candidate tracking targets corresponding to each head-shoulder region as a tracking target of the corresponding head-shoulder region in the current frame image; and correspondingly updating each head-shoulder region in the tracking sequence set according to the tracking target of each head-shoulder region in the current frame image.

In an exemplary embodiment of the present disclosure, the method further includes: calculating a tracker corresponding to each head-shoulder region, including:

obtaining a first training sample set corresponding to each head-shoulder region in the tracking sequence set in the previous frame image based on the position of each head-shoulder region in the tracking sequence set in the previous frame image, respectively:

training a regression model according to the first training sample set corresponding to each head-shoulder region respectively to obtain the tracker corresponding to each head-shoulder region.

In an exemplary embodiment of the present disclosure, the method further includes generating the head-shoulder recognition model according to a convolutional neural network, including:

training a MobileNet network according to an ImageNet categorical dataset to obtain a weight value of the MobileNet network;

adding convolutional layers with a preset number of layers above the MobileNet network to obtain a head-shoulder detection network, wherein a size of the convolutional layers decreases layer by layer;

obtaining a second training sample set that marks the head shoulder regions, and training the head-shoulder detection network that retains the weight value of the MobileNet network according to the second training sample set to obtain the head-shoulder recognition model.

In an exemplary embodiment of the present disclosure, updating the tracking sequence set according to the head-shoulder regions in the current frame image includes:

calculating similarity between each head-shoulder region in the current frame image and each head-shoulder region in the tracking sequence set; and updating the tracking sequence set according to the similarity.

In an exemplary embodiment of the present disclosure, calculating similarity between each head-shoulder region in the current frame image and each head-shoulder region in the tracking sequence set includes:

calculating similarity between each head-shoulder region in the current frame image and each head-shoulder region in the tracking sequence set according to the following equation:

$$sim(Q_i, Q_j) = \frac{Q_i\text{area} \cap Q_j\text{area}}{Q_i\text{area} \cup Q_j\text{area}}$$

wherein, $sim(Q_i, Q_j)$ is the similarity between the i-th head-shoulder region $Q_i$ in the current frame image and the j-th head-shoulder region $Q_j$ in the tracking target set, $Q_i^{area}$ is an area of the i-th head-shoulder region $Q_i$ in the current frame image, and $Q_j^{area}$ is an area of the j-th head-shoulder region $Q_j$ in the tracking sequence set.

In an exemplary embodiment of the present disclosure, updating the tracking sequence set according to the similarity includes:

matching each head-shoulder region in the current frame image with each head-shoulder region in the tracking sequence set according to the similarity and a similarity threshold, respectively;

If the matching successes, replacing the head-shoulder region in the tracking sequence set with the matched successfully head-shoulder region in the current frame image;

If the matching fails, adding the matched unsuccessfully head-shoulder region in the current frame image to the tracking sequence set.

In an exemplary embodiment of the present disclosure, replacing the head-shoulder region in the tracking sequence set with the matched successfully head-shoulder region in the current frame image includes:

calculating a confidence of the matched successfully head-shoulder regions in the current frame image and a confidence of a corresponding head-shoulder region in the tracking sequence set, respectively;

when the confidence of the matched successfully head-shoulder region in the current frame image is greater than the confidence of a corresponding head-shoulder region in the tracking sequence set, replacing the head-shoulder region in the tracking sequence set with the matched successfully head-shoulder region in the current frame image correspondingly.

In an exemplary embodiment of the present disclosure, a calculation equation of the confidence is:

$$conf(obj) = \alpha * \frac{B}{\text{area}(obj)} + (1 - \alpha) * \text{Score}(obj)$$

wherein, conf(obj) is the confidence of obj, obj is the head-shoulder region in the current frame image or the head-shoulder region in the tracking sequence set, area(obj) is an area of obj, and Score(obj) is a class belonging probability of obj calculated by the head-shoulder recognition model, and $\alpha$ is 0.5, and B is 1000.

In an exemplary embodiment of the present disclosure, before analyzing a motion trajectory of each head-shoulder region in the tracking sequence set to count the pedestrians, the method further includes:

when there is a head-shoulder region in a tracking state in the tracking sequence set that has not been updated by the head-shoulder regions obtained from each frame image in images with a first preset number of frames, changing the head-shoulder region that has not been updated by the head-shoulder regions obtained from each frame image in the images with the first preset number of frames from the tracking state to an abnormal state; and when there is a head-shoulder region in the abnormal state in the tracking sequence set that has not been updated by the head-shoulder regions obtained from each frame image in images with a second preset number of frames, deleting the head-shoulder region in the abnormal state in the tracking sequence set that has not been updated by the head-shoulder regions obtained from each frame image in the images with the second preset number of frames.

In an exemplary embodiment of the present disclosure, analyzing a motion trajectory of each head-shoulder region in the tracking sequence set to count the pedestrians includes:

analyzing the motion trajectory of each head-shoulder region in the tracking sequence set; and counting the pedestrians according to the motion trajectory of each head-shoulder region and in combination with a virtual counting line.

In an exemplary embodiment of the present disclosure, the method further includes: constructing the gender-age recognition model, including:

obtaining a third training sample set marking gender and age in a LFW dataset and a social network site;

training a gender-age network by using the third training sample set to obtain the gender-age recognition model, wherein the gender-age network includes three convolutional layers and three fully connected layers.

According to an aspect of the present disclosure, a device for generating a pedestrian flow funnel is provided, including:

a tracking and updating module, configured to obtain a current frame image, and track and update head-shoulder regions in a tracking sequence set in the current frame image according to a multi-target tracking algorithm;

a detecting and updating module, configured to obtain the head-shoulder region in the current frame image according to a head-shoulder recognition model, and update the tracking sequence set according to the head-shoulder regions in the current frame image; and a technology generating module, configured to analyze a motion trajectory of each head-shoulder region in the tracking sequence set to count the pedestrians, and when the current frame image is a last frame image, generate the pedestrian flow funnel based on a counting result of the pedestrians.

According to an aspect of the present disclosure, a computer-readable storage medium having a computer program stored therein is provided, wherein the computer program, when executed by a processor, causes the implementation of any one of the methods for generating a pedestrian flow funnel described above.

According to an aspect of the present disclosure, there is provided an electronic device including:

a processor; and a memory for storing executable instructions of the processor;

wherein, the processor is configured to execute any one of the methods for generating a pedestrian flow funnel described above by performing the executable instructions.

It should be noted that the above general description and the following detailed description are merely exemplary and explanatory and should not be construed as limiting of the disclosure.

BRIEF DESCRIPTION OF THE DRAWINGS

The above and other features and advantages of the present disclosure will become more apparent by describing its exemplary embodiments in detail with reference to the accompanying drawings. It is apparent that the drawings in the following description show only some of the embodiments of the present disclosure, and other drawings may also be obtained by those skilled in the art based on these drawings without creative labor.

FIG. 1d shows steps of the method before analyzing a motion trajectory of each head-shoulder region in the tracking sequence set to count the pedestrians;

DETAILED DESCRIPTION

Figure 1:
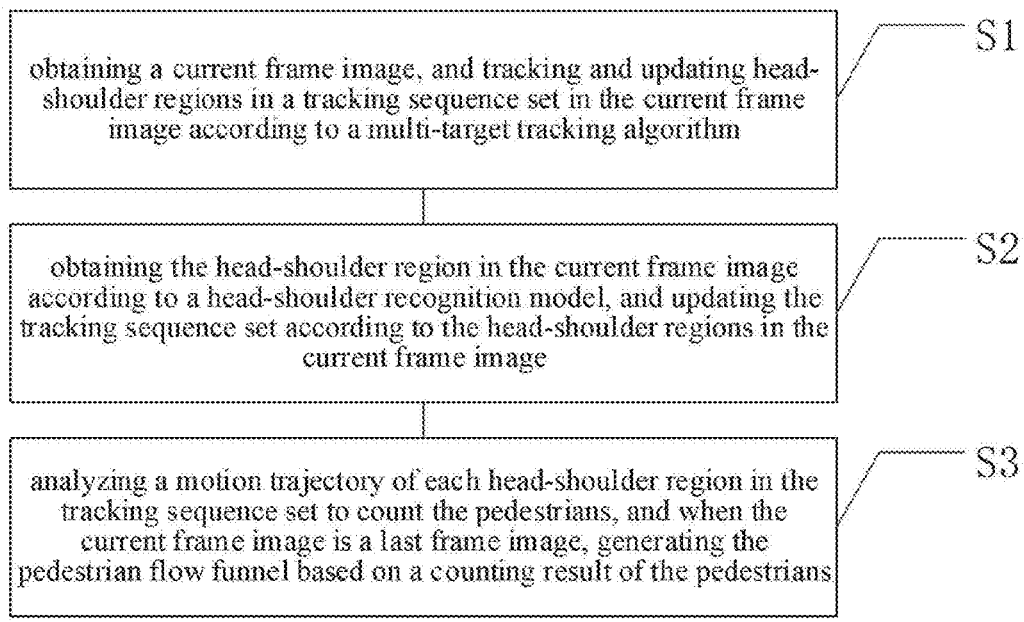
FIG. 1 is a flowchart of a method for generating a pedestrian flow funnel of the present disclosure.

Exemplary embodiments will now be described more fully with reference to the accompanying drawings. However, the exemplary embodiments can be implemented in a variety of forms and should not be construed as being limited to the embodiments set forth herein; rather, these embodiments are provided so that this disclosure will be more comprehensive and complete so as to convey the idea of the exemplary embodiments to those skilled in this art. The same reference numerals in the drawings denote the same or similar parts, and the detailed description thereof will be omitted.

In addition, the features, structures, or characteristics described may be combined in any suitable manner in one or more embodiments. In the description below, numerous specific details are set forth to provide a thorough understanding of the embodiments of the present disclosure. However, those skilled in the art will appreciate that the technical solution of the present disclosure may be practiced without one or more of the specific details, or other methods, components, materials, devices, steps and the like may be employed. In other instances, well-known structures, methods, devices, implementations, materials or operations are not shown or described in detail to avoid obscuring various aspects of the present disclosure.

Some of the block diagrams shown in the figures are merely functional entities and do not necessarily correspond to physically separate entities. That is, these functional entities may be implemented in software, or these functional entities or a part of these functional entities may be implemented in one or more software hardening modules, or these functional entities may be implemented in different networks and/or processor devices and/or microcontroller devices.

In related video surveillance technologies, the statistics for the flow of people are mainly achieved by manual counting of the monitoring personnel. This method of manually counting the flow of people is more reliable in the case of short monitoring time and sparse flow of people. Due to limitation of biological characteristics of human eyes, when the monitoring time is long and the flow of people is dense, the accuracy of the statistics will be greatly reduced (i.e., missing detection occurs), and the manual statistical manner requires a lot of labor costs. On this basis, if someone wants to perform statistics on the gender and age of the flow of people, the efficiency and accuracy of the statistics will be further reduced, and the cost will be increased. In addition, because the statistical accuracy of the flow of people and gender and age is low, the accuracy of the flow funnel based on the inaccurate statistics of the flow of people and gender and age is also not high. Therefore, statisticians cannot get more accurate analysis data through this flow funnel.

This exemplary embodiment first discloses a method for generating a pedestrian flow funnel. Referring to FIG. 1, the method for generating a pedestrian flow funnel may include the following steps.

In step S1, a current frame image is obtained, and head-shoulder regions in a tracking sequence set in the current frame image are tracked and updated according to a multi-target tracking algorithm.

In step S2, the head-shoulder region in the current frame image is obtained according to a head-shoulder recognition model, and the tracking sequence set is updated according to the head-shoulder regions in the current frame image.

In step S3, a motion trajectory of each head-shoulder region in the tracking sequence set is analyzed to count the pedestrians, and when the current frame image is a last frame image, the pedestrian flow funnel is generated based on a counting result of the pedestrians.

According to the method for generating a pedestrian flow funnel in this exemplary embodiment, on the one hand, through the multi-target tracking algorithm combined with the head-shoulder recognition model, missing detection of the head-shoulder region may be avoided, improving the accuracy in detecting the head-shoulder region, further improving the accuracy of the pedestrian counting, and improving the accuracy of the pedestrian flow funnel. On the other hand, the head-shoulder region can be obtained quickly and at a low cost through the head-shoulder recognition model, thereby increasing the counting speed of the head-shoulder region and reducing the counting cost, thereby increasing the speed of generating the pedestrian flow funnel and reducing the cost of generating the pedestrian flow funnel.

Hereinafter, a method for generating a pedestrian flow funnel in this exemplary embodiment will be further described with reference to FIG. 1.

In step S1, a current frame image is obtained, and head-shoulder regions in a tracking sequence set in the current frame image are tracked and updated according to a multi-target tracking algorithm.

In this exemplary embodiment, before obtaining a current frame image, the method may further include: obtaining a first frame image, and obtaining head-shoulder regions in the first frame image according to the head-shoulder recognition model, and initializing the tracking sequence set through the head-shoulder regions. In this exemplary embodiment, the video data transmitted by the monitoring device can be received in real time, and the first frame image can be intercepted from the video data. For example, when counting the flow of people and gender and age groups during business hours of a shopping mall, an image of the start time of the business hours of the shopping mall can be obtained as the first frame image. For example, images can be obtained from 8:00. When the first frame image is obtained, the head-shoulder region in the first frame image is identified according to the head-shoulder recognition model; after the head-shoulder region is identified, the tracking sequence set is initialized according to the identified head-shoulder region. That is, the identified head-shoulder region is added into the tracking sequence set. It should be noted that when the head-shoulder region in the first frame image is identified through the head-shoulder recognition model, the Score value of each head-shoulder region (i.e., the class belonging probability of each head-shoulder region) can also be calculated through the head-shoulder recognition model.

Figure 1A:
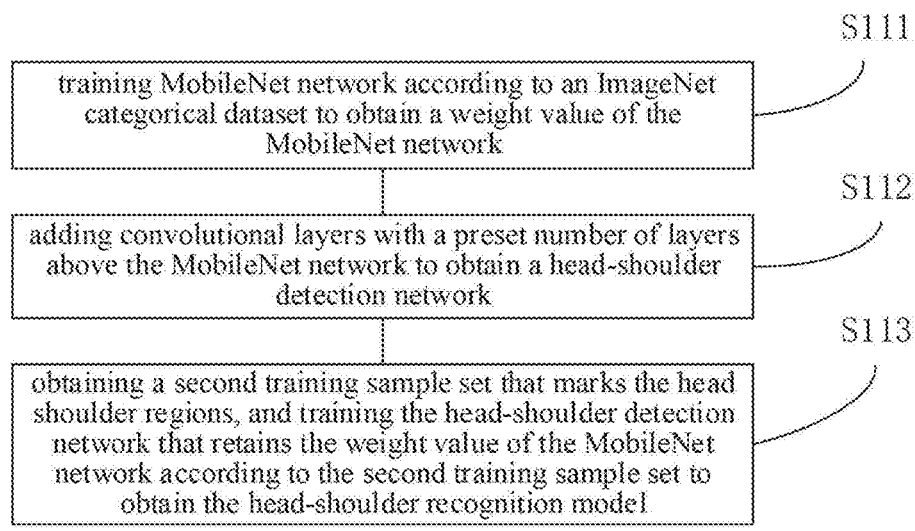
FIG. 1a shows the process of generating the head-shoulder recognition model according to a convolutional neural network.

In this exemplary embodiment, the head-shoulder recognition model may be generated according to a convolutional neural network. Specifically, as shown in FIG. 1a, the process of generating the head-shoulder recognition model according to a convolutional neural network includes the following steps.

In step S111, a MobileNet network is trained according to an ImageNet categorical dataset to obtain a weight value of the MobileNet network.

In this exemplary embodiment, the ImageNet is the largest database for image recognition in the world currently. The MobileNet network is a deep neural network which is based on a streamlined architecture and uses a deeply separable convolution lightweight, which can decompose a standard convolution into a deep convolution and a point convolution. That is, every convolution kernel is applied to each channel, and the 1×1 convolution is used to combine the output of the channel convolution. It has been proved that this decomposition can effectively reduce the amount of calculation, reduce the model size, and the network performance is good and the speed is also very fast. In step S11, each image having marked the head-shoulder region in the ImageNet categorical dataset may be input into the MobileNet network to obtain a weight value of the MobileNet network.

In step S112, convolutional layers with a preset number of layers are added above the MobileNet network to obtain a head-shoulder detection network, wherein a size of the convolutional layers decreases layer by layer.

In this exemplary embodiment, the preset number of layers may be set according to specific requirements, for example, it may be 3 layers or 6 layers, which is not particularly limited in this exemplary embodiment. The size of the convolutional layers decreases layer by layer, so that the multi-dimensional prediction of the head-shoulder region is completed by using the convolutional layers decreasing layer by layer.

In step S113, a second training sample set that marks the head shoulder regions is obtained, and the head-shoulder detection network that retains the weight value of the MobileNet network is trained according to the second training sample set to obtain the head-shoulder recognition model.

In this exemplary embodiment, in order to ensure the diversity of the second training sample set to improve the accuracy of the head-shoulder recognition model identifying the head-shoulder region, head-shoulder images with different angles and different backgrounds (branch occlusion, building occlusion, etc.) can be obtained through the image obtaining module, and the head-shoulder region in each head-shoulder image is marked to obtain the second training sample set marking the head-shoulder regions. Based on the second training sample set and using a mobility learning method, the head-shoulder detection network retaining the weight value of the MobileNet network is trained to obtain the head-shoulder recognition model. Specifically, the images marking the head-shoulder regions in the second training sample set is input to the head-shoulder detection network to obtain the weight value in the head-shoulder detection network. The loss of the head-shoulder detection network is basically stable and does not decrease, and when the average value is 0.8, the head-shoulder detection network is the head-shoulder recognition model.

In this exemplary embodiment, the tracking sequence set in the step S1 is a tracking sequence set updated in the previous frame image of the current frame image. It should be noted that when the previous frame image of the current frame image is the first frame image, the tracking sequence set at this time is the tracking sequence set initialized in the first frame image.

Figure 1B:
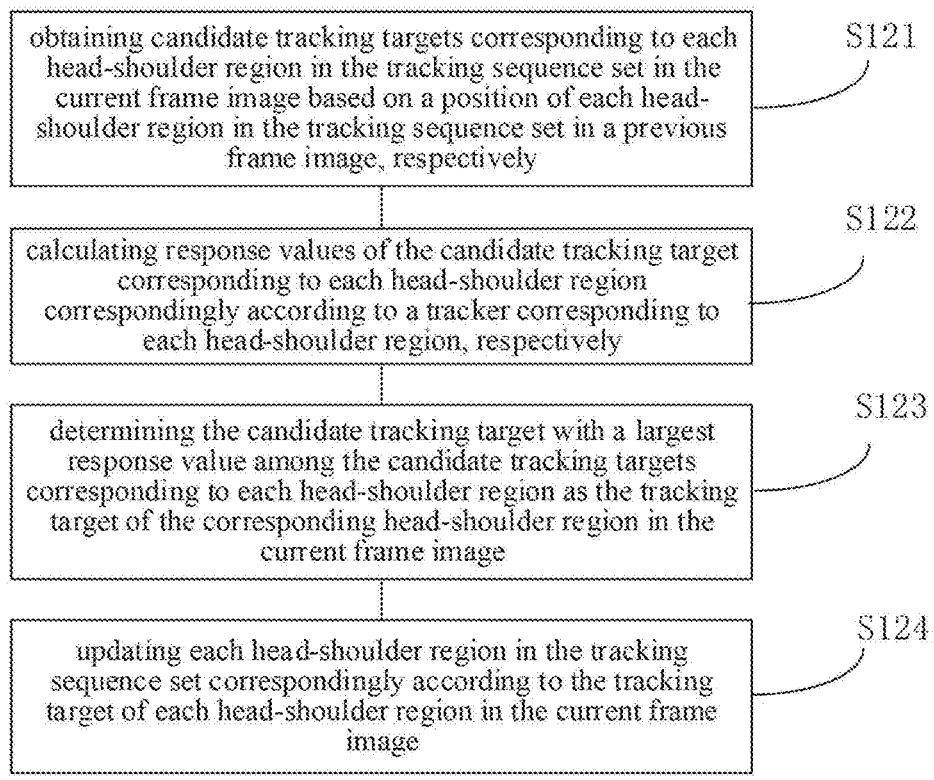
FIG. 1b shows the tracking and updating the head-shoulder regions in the tracking sequence set in the current frame image according to a kernel correlation filter tracking algorithm respectively.

In step S1, tracking and updating head-shoulder regions in a tracking sequence set in the current frame image according to a multi-target tracking algorithm may include: tracking and updating the head-shoulder regions in the tracking sequence set in the current frame image according to a kernel correlation filter tracking algorithm, respectively. Specifically, as shown in FIG. 1b, tracking and updating the head-shoulder regions in the tracking sequence set in the current frame image according to a kernel correlation filter tracking algorithm respectively may include following steps.

In step S121, candidate tracking targets corresponding to each head-shoulder region in the tracking sequence set in the current frame image are obtained based on a position of each head-shoulder region in the tracking sequence set in a previous frame image, respectively.

In this exemplary embodiment, candidate tracking targets corresponding to each head-shoulder region in the tracking sequence set may be sequentially obtained. The number of the candidate tracking targets corresponding to each head-shoulder region may be multiple. The following description is made by taking the obtaining the candidate tracking targets corresponding to the first head-shoulder region in the tracking sequence set as an example. In the current frame image, the position of the first head-shoulder region in the previous frame image is used as the center, and multiple candidate tracking targets are obtained within a preset range. The multiple candidate tracking targets are candidate tracking targets corresponding to the first head-shoulder region. The preset range may be set by a developer. When candidate tracking targets corresponding to other head-shoulder regions in the tracking sequence set are obtained, the obtaining principle is the same as that of obtaining the candidate tracking targets corresponding to the first head-shoulder region, and only the obtaining positions are changed, so it will not be repeated here.

In step S122, response values of the candidate tracking target corresponding to each head-shoulder region is correspondingly calculated according to a tracker corresponding to each head-shoulder region, respectively.

In this exemplary embodiment, a process of calculating the tracker corresponding to each head-shoulder region will be described first. Calculating a tracker corresponding to each head-shoulder region may include: obtaining a first training sample set corresponding to each head-shoulder region in the tracking sequence set in the previous frame image based on the position of each head-shoulder region in the tracking sequence set in the previous frame image, respectively; and training a regression model according to the first training sample set corresponding to each head-shoulder region respectively to obtain the tracker corresponding to each head-shoulder region.

In this exemplary embodiment, description is made by taking the calculating the tracker corresponding to the first head-shoulder region in the tracking sequence set as an example. In the previous frame image, the position of the first head-shoulder region in the previous frame image is used as the center, and multiple first training samples are obtained to form the first training sample set corresponding to the first head-shoulder region. All the first training samples in the first training sample set are input to the regression model to train the regression model, and the trained regression model is determined as the tracker corresponding to the first head-shoulder region. The process of calculating trackers corresponding to other head-shoulder regions in the tracking sequence set is the same as the above-mentioned process of calculating the tracker corresponding to the first head-shoulder region, and only the positions of obtaining the first training sample set are different, so it will not be repeated here.

It can be seen from above that when the trackers corresponding to the head-shoulder regions are calculated, the first training sample set corresponding to the head-shoulder region is obtained in the previous frame image based on the position of the head-shoulder region in the previous frame image. In addition, since the positions of the same head-shoulder region in different frame images are different, the trackers corresponding to the same head-shoulder region in different frame images are different. Based on this, the response value calculated by the tracker corresponding to each frame is more accurate, thereby making the tracking determination of the tracking target more accurate.

Based on this, the description is made by taking the calculating the response value of the candidate tracking target corresponding to the first head-shoulder region according to the tracker corresponding to the first head-shoulder region as an example. Each candidate tracking target corresponding to the first head-shoulder region is substituted into the tracker corresponding to the first head-shoulder region to obtain the response value of each candidate target corresponding to the first head-shoulder region. The process of calculating the response values of the candidate tracking targets corresponding to other head-shoulder regions in the tracking sequence set is the same as the process of calculating the response value of the candidate tracking target corresponding to the first head-shoulder region, and only the tracker is changed. That is, the tracker is required to correspond to the head-shoulder region, which is not repeated here.

In step S123, the candidate tracking target with a largest response value among the candidate tracking targets corresponding to each head-shoulder region is determined as the tracking target of the corresponding head-shoulder region in the current frame image.

In this exemplary embodiment, the description is made by taking the first head-shoulder region in the tracking sequence set as an example. The response value of each candidate tracking target corresponding to the first head-shoulder region is compared, and the candidate tracking target with the largest response value is determined as the tracking target of the first head-shoulder region in the current frame image. That is, the candidate tracking target is the first head-shoulder region in the current frame image. It should be noted that the determination manner of the tracking target of other head-shoulder regions in the tracking sequence set in the current frame image is the same as the determination manner of the tracking target of the first head-shoulder region in the current frame image, so it is not described here again.

In step S124, each head-shoulder region in the tracking sequence set is correspondingly updated according to the tracking target of each head-shoulder region in the current frame image.

In this exemplary embodiment, each head-shoulder region in the tracking sequence set is correspondingly replaced with the tracking target corresponding to each head-shoulder region in the tracking sequence set in the current frame image, to update each head-shoulder region in the tracking sequence set.

In summary, when the head-shoulder region enters the background covered by shelters such as branches from the open background, the head-shoulder recognition model may not be able to detect the head-shoulder region in the background image with the shelters. Based on this, when the head-shoulder region in the current frame is detected only by the head-shoulder recognition model to track the head-shoulder region in the tracking sequence set, the head-shoulder region in the tracking sequence may not be detected, thus causing the missing detection of the head-shoulder region. In this exemplary embodiment, all head-shoulder regions in the tracking sequence set can be tracked by using a multi-target tracking algorithm, thereby avoiding the missing detection of the head-shoulder region, improving the accuracy of detecting the head-shoulder region, improving the accuracy of the pedestrian counting, and further improving the accuracy of the pedestrian flow funnel.

In step S2, the head-shoulder region in the current frame image is obtained according to a head-shoulder recognition model, and the tracking sequence set is updated according to the head-shoulder regions in the current frame image.

In this exemplary embodiment, the current frame image is input to the head-shoulder recognition model to obtain the head-shoulder regions in the current frame image, and the tracking sequence set is updated according to the head-shoulder regions in the current frame image. That is, new head-shoulder regions are added to the tracking sequence set, and the original head-shoulder regions in the tracking sequence are updated. The head-shoulder regions can be obtained quickly and at a low cost through the head-shoulder recognition model, thereby increasing the counting speed of the head-shoulder region and reducing the counting cost, and increasing the speed of generating the pedestrian flow funnel and reducing the cost of generating the pedestrian flow funnel.

Updating the tracking sequence set according to the head-shoulder regions in the current frame image may include: calculating similarity between each head-shoulder region in the current frame image and each head-shoulder region in the tracking sequence set; and updating the tracking sequence set according to the similarity.

Calculating similarity between each head-shoulder region in the current frame image and each head-shoulder region in the tracking sequence set may include: calculating similarity between each head-shoulder region in the current frame image and each head-shoulder region in the tracking sequence set according to the following equation:

$$sim(Q_i, Q_j) = \frac{Q_i\text{area} \cap Q_j\text{area}}{Q_i\text{area} \cup Q_j\text{area}}$$

Wherein, $sim(Q_i, Q_j)$ is the similarity between the i-th head-shoulder region $Q_i$ in the current frame image and the j-th head-shoulder region $Q_j$ in the tracking target set, $Q_i^{area}$ is an area of the i-th head-shoulder region $Q_i$ in the current frame image, and $Q_j^{area}$ is an area of the j-th head-shoulder region $Q_j$ in the tracking sequence set.

The description is made by taking the calculating similarity between the first head-shoulder region in the current frame image and each head-shoulder region in the tracking sequence set as an example. The area of the first head-shoulder region in the current frame image and the area of each head-shoulder region in the tracking sequence set are obtained. The similarity between the first head-shoulder region in the current frame image and each head-shoulder region in the tracking sequence set is calculated respectively by using the above equation. It should be noted that by repeating the above steps, the similarities between other head-shoulder regions in the current frame image and each head-shoulder region in the tracking sequence set can be calculated.

Figure 1C:
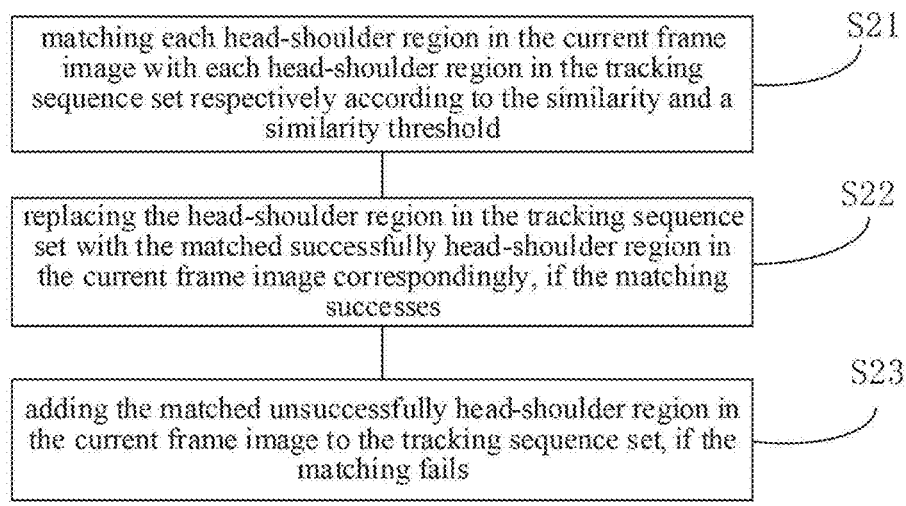
FIG. 1c shows updating the tracking sequence set according to the similarity.

Updating the tracking sequence set according to the similarity may include following steps, as shown in FIG. 1c.

In step S21, each head-shoulder region in the current frame image is matched with each head-shoulder region in the tracking sequence set respectively according to the similarity and a similarity threshold.

In this exemplary embodiment, the similarity threshold may be 0.5, but this exemplary embodiment does not specifically limit this. The description is made by taking the matching process of the first head-shoulder region in the current frame image as an example. First, the maximum similarity between the first head-shoulder region and each head-shoulder region in the tracking sequence set is obtained, and it is judged whether the maximum similarity is greater than the similarity threshold. When it is determined that the maximum similarity is greater than the similarity threshold, it is considered that the matching is successful. That is, the first head-shoulder region and the corresponding head-shoulder region in the tracking sequence set are the same head-shoulder region. When it is determined that the maximum similarity is not greater than the similarity threshold, it is considered that the matching fails. That is, the head-shoulder region is a new head-shoulder region.

In step S22, if the matching successes, the head-shoulder region in the tracking sequence set is replaced with the matched successfully head-shoulder region in the current frame image correspondingly.

In this exemplary embodiment, the description is made by taking the first head-shoulder region in the current frame image as an example. When the maximum similarity between the first head-shoulder region and each head-shoulder region in the tracking sequence set is greater than the similarity threshold, the first head-shoulder region replaces the head-shoulder region in the tracking sequence set correspondingly.

In order to further increase the accuracy of matching, replacing the head-shoulder region in the tracking sequence set with the matched successfully head-shoulder region in the current frame image correspondingly may include: calculating a confidence of the matched successfully head-shoulder regions in the current frame image and a confidence of a corresponding head-shoulder region in the tracking sequence set, respectively; and when the confidence of the matched successfully head-shoulder region in the current frame image is greater than the confidence of a corresponding head-shoulder region in the tracking sequence set, replacing the head-shoulder region in the tracking sequence set with the matched successfully head-shoulder region in the current frame image correspondingly.

In this exemplary embodiment, a calculation equation of the confidence is:

$$conf(obj) = \alpha * \frac{B}{\text{area}(obj)} + (1 - \alpha) * \text{Score}(obj)$$

wherein, conf(obj) is the confidence of obj, obj is the head-shoulder region in the current frame image or the head-shoulder region in the tracking sequence set, area(obj) is an area of obj, and Score(obj) is a class belonging probability of obj calculated by the head-shoulder recognition model, and $\alpha$ is 0.5, and B is 1000.

The above process is described by taking the successful matching of the first head-shoulder region in the current frame image with the third head-shoulder region in the tracking sequence set as an example. The confidence of the first head-shoulder region in the current frame image and the confidence of the third head-shoulder region in the tracking sequence set are calculated respectively by the above confidence equation. When the confidence of the first head-shoulder region in the current frame image is greater than the confidence of the third head-shoulder region in the tracking sequence set, the third head-shoulder region in the tracking sequence set is replaced with the first head-shoulder region in the current frame image.

In step S23, if the matching fails, the matched unsuccessfully head-shoulder region in the current frame image is added to the tracking sequence set.

In this exemplary embodiment, the description is made by taking the first head-shoulder region in the current frame image as an example. When the maximum similarity between the first head-shoulder region in the current frame image and each head-shoulder region in the tracking sequence set is not greater than the similarity threshold, the first head-shoulder region is added to the tracking sequence set to be a new tracking target.

It can be known from the above that by obtaining the head-shoulder regions in the current frame image through the head-shoulder recognition model, calculating the similarity between each head-shoulder region in the current frame image and each head-shoulder region in the tracking sequence set, and updating the tracking sequence set according to the similarity, the detected new head-shoulder region may be added to the tracking sequence set, and the original head-shoulder regions in the tracking sequence set can be updated, which improves the accuracy of the detection of the head-shoulder region and improving the accuracy of the counting, avoiding the missing detection of the tracking targets, thereby further improving the accuracy of the pedestrian flow funnel.

In step S3, a motion trajectory of each head-shoulder region in the tracking sequence set is analyzed to count the pedestrians, and when the current frame image is a last frame image, the pedestrian flow funnel is generated based on a counting result of the pedestrians.

In this exemplary embodiment, in order to provide the accuracy of the tracking target and thereby improve the accuracy of the pedestrian counting, before analyzing a motion trajectory of each head-shoulder region in the tracking sequence set to count the pedestrians, the method may further include following steps, as shown in FIG. 1d.

In step S31, when there is a head-shoulder region in a tracking state in the tracking sequence set that has not been updated by the head-shoulder regions obtained from each frame image in images with a first preset number of frames, the head-shoulder region that has not been updated by the head-shoulder regions obtained from each frame image in the images with the first preset number of frames is changed from the tracking state to an abnormal state.

In this exemplary embodiment, the images with the first preset number of frames may be continuous 5 frame images or continuous 10 frame images, which is not specifically limited in this exemplary embodiment. The step S31 is described by taking the continuous 5 frame images as an example. The head-shoulder regions corresponding to the above 5 frame images are obtained according to the head-shoulder recognition model, respectively. There is no head-shoulder region in the head-shoulder regions corresponding to the above 5 frame images matching successfully with one of the head-shoulder regions in the tracking sequence set in the tracking state, and it is considered that this head-shoulder region in the tracking sequence set is the abnormal head-shoulder region, and this head-shoulder region is changed from the tracking state to the abnormal state.

In step S32, when there is a head-shoulder region in the abnormal state in the tracking sequence set that has not been matched successfully in the images with the second preset number of frames, the head-shoulder region in the abnormal state in the tracking sequence set that has been matched successfully in the images with the second preset number of frames is deleted.

In this exemplary embodiment, the images with the second preset number of frames may be continuous 5 frame images or continuous 10 frame images, which is not specifically limited in this exemplary embodiment. The step S32 is described by taking the continuous 5 frame images as an example. The head-shoulder regions corresponding to the above 5 frame images are obtained according to the head-shoulder recognition model, respectively. There is no head-shoulder region in the head-shoulder regions corresponding to the above 5 frame images matching successfully with one of the head-shoulder regions in the tracking sequence set in the abnormal state, and it is considered that this head-shoulder region in the tracking sequence set is a false-detected head-shoulder region, and this head-shoulder region is deleted from the tracking sequence set.

In step S3, analyzing the motion trajectory of each head-shoulder region in the tracking sequence set to count the pedestrians may include: analyzing the motion trajectory of each head-shoulder region in the tracking sequence set; and counting the pedestrians according to the motion trajectory of each head-shoulder region and in combination with a virtual counting line.

Figure 2:
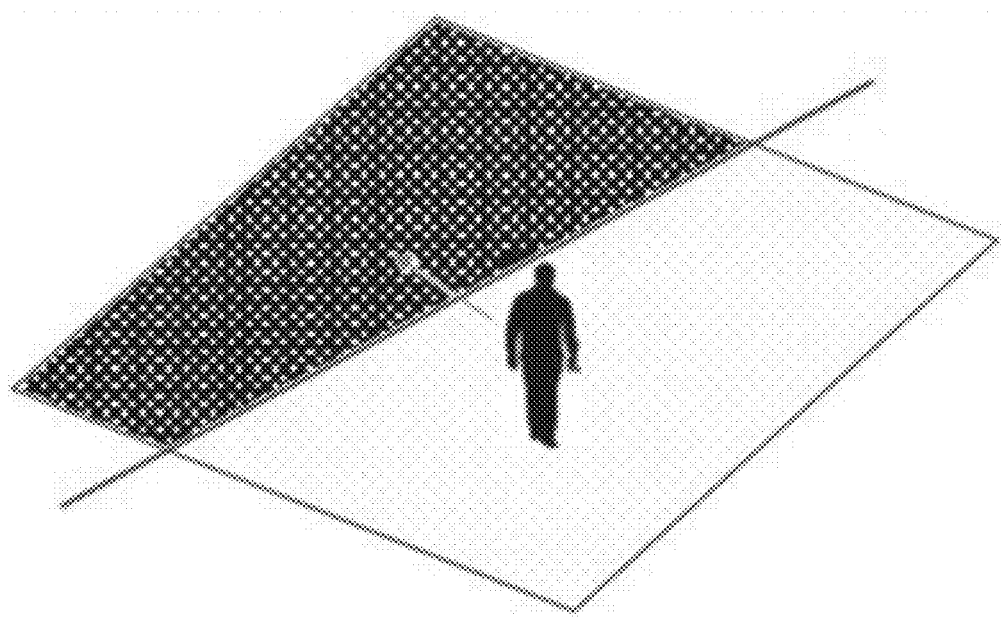
FIG. 2 is a schematic diagram of a mask layout provided by an exemplary embodiment of the present disclosure.

In this exemplary embodiment, the motion trajectory of each head-shoulder region may be generated according to positions of each head-shoulder region in a tracking sequence set in different frame images. In order to facilitate counting, in this exemplary embodiment, a virtual counting line may be set, and the counting of pedestrians in different directions may be performed by determining whether the motion trajectory of the head-shoulder region crosses the virtual counting line and the direction of crossing the virtual counting line. Specifically, the process of counting of pedestrians in different directions may be performed by determining whether the motion trajectory of the head-shoulder region crosses the virtual counting line and the direction of crossing the virtual counting line includes: the mask layout MASK can be used to represent the regions on both sides of the virtual counting line (as shown in FIG. 2), for example, the first region and the second region. Based on this, according to the pixel value of the motion trajectory of each head-shoulder region, it is determined whether each head-shoulder region crosses from the first region to the second region; or whether each head-shoulder region crosses from the second region to the first region.

For example, the first region is the inside of one cell, and the second region is the outside of one cell. When one head-shoulder region crosses the first region to the second region, the number of people coming out of the cell adds 1. When one head-shoulder region crosses the second region to the first region, the number of people coming into the cell adds 1.

It should be noted that, in order to prevent repeated counting, the head-shoulder regions that have been counted may be marked. It can be known from the above that the pedestrian is counted according to the motion trajectory of each head-shoulder region and a virtual counting line, the counting method is simple, easy to implement, and the counting accuracy is high.

After counting the pedestrians according to the motion trajectory of each head-shoulder region, it is determined whether the current frame image is the last frame image. When the current frame image is not the last frame image, steps S2 and S3 are repeated to continue counting the pedestrians. When the current frame image is the last frame image, the pedestrian flow funnel is generated based on the counting result of the pedestrians. For example, the flow of people at different time periods can be analyzed to generate a pedestrian flow funnel, so that the staff can analyze business process issues based on the pedestrian flow funnel, etc., to control macro data.

In order to enable the pedestrian flow funnel to cover more dimensions of data, so that staff can analyze business process issues from multiple dimensions according to the pedestrian flow funnel to control macro data, the method further includes: identifying age groups and gender of each head-shoulder region in the tracking sequence set according to a gender-age recognition model; and generating the pedestrian flow funnel based on the counting result of the pedestrians and in combination with the age groups and gender of each head-shoulder region in the tracking sequence set.

In this exemplary embodiment, the process of constructing the gender-age recognition model will be described first. The constructing the gender-age recognition model may include: obtaining a third training sample set marking gender and age in a LFW dataset and a social network site; and tracking a gender-age network by using the third training sample set to obtain the gender-age recognition model. The gender-age network includes three convolutional layers and three fully connected layers.

In this exemplary embodiment, the gender-age network including three convolutional layers and three fully connected layers is established; the third training sample set is obtained in the LFW data collection social platform, and the cropping is performed by using the face of each third training sample in the third training sample set as the center. For example, the third training sample with the size of 256*256 is cropped into the third training sample with the size of 227*227, with the face as the center. The cropped training sample is marked by gender and age. The gender is identified as male or female, and the age is identified according to the age group. For example, the age can be identified in 8 age groups for identification, which are 0~3, 4~7, 8~14, 15~24, 25~37, 38~47, 48~59, 60+ respectively. It should be noted that the division of the age group is not limited to this, the developer can set it according to needs; the weight values in the gender-age network are initialized by using a normal Gaussian distribution with a standard deviation of 0.01 and a mean of 0; and the initialized gender-age network is trained by the stochastic gradient descent and in combination with the dropout, to obtain the gender-age recognition model. The dropout ratio is 0.5.

The age group and the gender of each head-shoulder region in each tracking sequence set are identified based on the gender-age recognition model. It should be noted that only the age group and the gender of the head-shoulder region that is added to the tracking sequence set at first time need to be identified. In addition, since the identification of the age group and the identification of the gender use the same gender-age recognition model, the output of the gender-age recognition model is 2 when the age is identified, and the output of the gender-age recognition model is 8 when the gender is identified.

On this basis, after the gender and age of the head-shoulder region are identified, the pedestrian flow funnel is generated based on the counting result of the pedestrians and in combination with the age groups and gender of each head-shoulder region in the tracking sequence set. For example, the pedestrian flow funnel can be obtained by analyzing the pedestrian flow at different time periods and gender ratio and age ratio, so that the staff can analyze business process problems from multiple dimensions according to the pedestrian flow funnel to control the macro data.

It should be noted that although the various steps of the method of the present disclosure are described in a particular order in the figures, this is not required or implied that the steps must be performed in the specific order, or all the steps shown must be performed to achieve the desired result. Additionally or alternatively, certain steps may be omitted, multiple steps may be combined into one step, and/or one step may be decomposed into multiple steps and so on.

Figure 3:
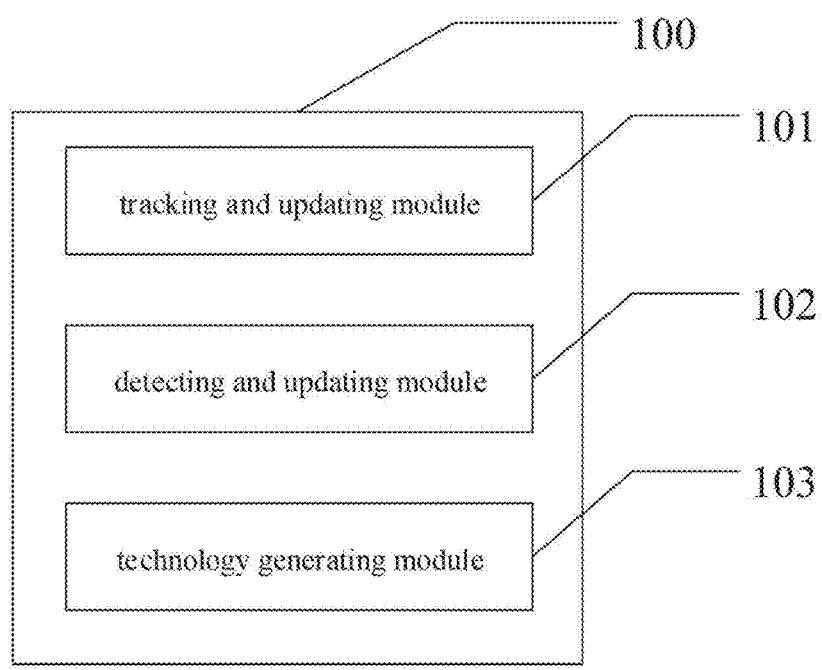
FIG. 3 is a block diagram of a method for generating a pedestrian flow funnel of the present disclosure.

In the exemplary embodiment of the present disclosure, a device for generating a pedestrian flow funnel is provided. As shown in FIG. 3, the device for generating a pedestrian flow funnel 100 may include a tracking and updating module 101, a detecting and updating module 102 and a technology generating module 103.

The tracking and updating module 101 may be configured to obtain a current frame image, and track and update head-shoulder regions in a tracking sequence set in the current frame image according to a multi-target tracking algorithm.

The detecting and updating module 102 may be configured to obtain the head-shoulder region in the current frame image according to a head-shoulder recognition model, and update the tracking sequence set according to the head-shoulder regions in the current frame image.

The technology generating module 103 may be configured to analyze a motion trajectory of each head-shoulder region in the tracking sequence set to count the pedestrians, and when the current frame image is a last frame image, generate the pedestrian flow funnel based on a counting result of the pedestrians.

The specific details of each module of the device for generating a pedestrian flow funnel described above have been described in detail in the corresponding method for generating a pedestrian flow funnel, and therefore will not be repeated here.

The exemplary embodiment of present disclosure provides the method and apparatus for generating a pedestrian flow funnel, a storage medium, and an electronic device. First, a current frame image is obtained, and head-shoulder regions in a tracking sequence set in the current frame image are tracked and updated according to a multi-target tracking algorithm; then the head-shoulder region in the current frame image is obtained according to a head-shoulder recognition model, and the tracking sequence set is updated according to the head-shoulder regions in the current frame image; and finally, a motion trajectory of each head-shoulder region in the tracking sequence set is analyzed to count the pedestrians, and when the current frame image is a last frame image, the pedestrian flow funnel is generated based on a counting result of the pedestrians. On the one hand, through the multi-target tracking algorithm combined with the head-shoulder recognition model, missing detection of the head-shoulder region may be avoided, improving the accuracy in detecting the head-shoulder region, improving the accuracy of the pedestrian counting, and further improving the accuracy of the pedestrian flow funnel. On the other hand, the head-shoulder region can be obtained quickly and at a low cost through the head-shoulder recognition model, thereby increasing the counting speed of the head-shoulder region and reducing the counting cost, thereby increasing the speed of generating the pedestrian flow funnel and reducing the cost of generating the pedestrian flow funnel.

It should be noted that although modules or units of devices for executing functions are described above, such division of modules or units is not mandatory. In fact, features and functions of two or more of the modules or units described above may be embodied in one module or unit in accordance with the embodiments of the present disclosure. Alternatively, the features and functions of one module or unit described above may be further divided into multiple modules or units.

In an exemplary embodiment of the present disclosure, there is also provided an electronic device capable of implementing the above method.

Those skilled in the art may understand that various aspects of the present disclosure may be implemented as a system, method, or program product. Therefore, various aspects of the present disclosure may be embodied in the following forms: a complete hardware implementation, a complete software implementation (including firmware, microcode, etc.), or a combination of hardware and software, which may be collectively referred to herein "circuit", "module", or "system".

The electronic device 600 according to this embodiment of the present disclosure is described below with reference to FIG. 4. The electronic device 600 shown in FIG. 4 is merely an example, and should not impose any limitation on the functions and scope of use of the embodiment of the present disclosure.

Figure 4:
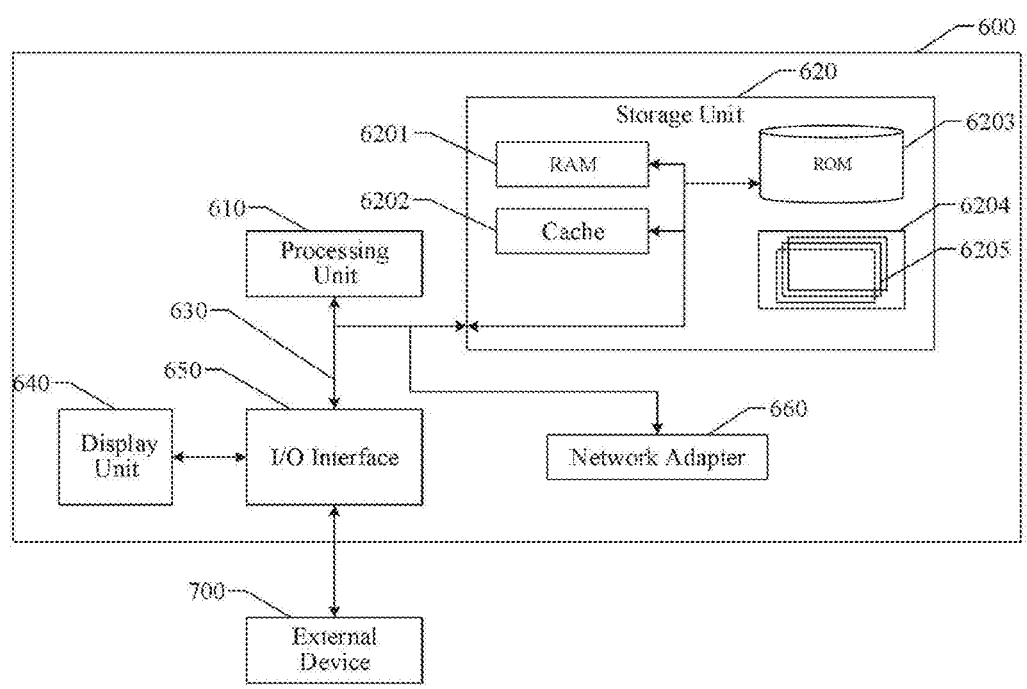
FIG. 4 is a schematic diagram of modules of an electronic device in an exemplary embodiment of the present disclosure.

As shown in FIG. 4, the electronic device 600 is expressed in the form of a general-purpose computing device. The components of the electronic device 600 may include, but are not limited to, at least one processing unit 610, at least one storage unit 620, and a bus 630 connecting different system components (including the storage unit 620 and the processing unit 610), and a display unit 640.

In the example above, the storage unit stores program codes, and the program codes may be executed by the processing unit 610, so that the processing unit 610 executes various steps of the exemplary embodiments according to the present disclosure described in the above-mentioned "exemplary method" in the specification. For example, the processing unit 610 may perform the steps as shown in FIG. 1: in step S1, a current frame image is obtained, and head-shoulder regions in a tracking sequence set in the current frame image are tracked and updated according to a multi-target tracking algorithm; in step S2, the head-shoulder region in the current frame image is obtained according to a head-shoulder recognition model, and the tracking sequence set is updated according to the head-shoulder regions in the current frame image; and in step S3, a motion trajectory of each head-shoulder region in the tracking sequence set is analyzed to count the pedestrians, and when the current frame image is a last frame image, the pedestrian flow funnel is generated based on a counting result of the pedestrians.

The storage unit 620 may include a readable medium in the form of a volatile storage unit, such as a random access storage unit (RAM) 6201 and/or a cache storage unit 6202, and may further include a read-only storage unit (ROM) 6203.

The storage unit 620 may further include a program/utility tool 6204 having a set of (at least one) program modules 6205. Such program modules 6205 include, but are not limited to, an operating system, one or more application programs, other program modules, and program data. Each or some combination of these examples may include an implementation of a network environment.

The bus 630 may be one or more of several types representing bus structures, including a storage unit bus or a storage unit controller, a peripheral bus, a graphics acceleration port, a processing unit, or a local bus that uses any bus structure in a variety of bus structures.

The electronic device 600 may also communicate with one or more external devices 700 (such as a keyboard, pointing device, Bluetooth device, etc.), may also communicate with one or more devices that enable a user to interact with the electronic device 600, and/or with any device (e.g., router, modem, etc.) that enables the electronic device 600 to communicate with one or more other computing devices. This communication may be performed through an input/output (I/O) interface 650. Moreover, the electronic device 600 may also communicate with one or more networks (such as a local area network (LAN), a wide area network (WAN), and/or a public network, such as the Internet) through the network adapter 660. As shown, the network adapter 660 communicates with other modules of the electronic device 600 through the bus 630. It should be understood that although not shown in the figure, other hardware and/or software modules may be used in conjunction with the electronic device 600, including but not limited to: microcode, device drivers, redundant processing units, external disk drive arrays, RAID systems, tape drives, data backup storage systems and the like.

Through the description of the above embodiments, those skilled in the art will readily understand that the exemplary embodiments described here may be implemented by software or by software in combination with necessary hardware. Therefore, the technical solution according to the embodiments of the present disclosure may be embodied in a form of software product, which may be stored in a non-volatile storage medium (which may be a CD-ROM, a USB disk, a mobile hard disk, etc.) or on a network, including a number of instructions to make a computing device (which may be a personal computer, a server, a terminal apparatus, or a network device, etc.) to perform the methods according to embodiments in the present disclosure.

In an exemplary embodiment of the present disclosure, there is also provided a computer-readable storage medium on which a program product capable of implementing the above-mentioned method of the present specification is stored. In some possible implementations, aspects of the present disclosure may also be implemented in the form of a program product, which includes program codes. When the program product runs on a terminal device, the program code is used to make the terminal device perform the steps according to various exemplary embodiments of the present disclosure described in the above-mentioned "exemplary method" section of this specification.

Figure 5:
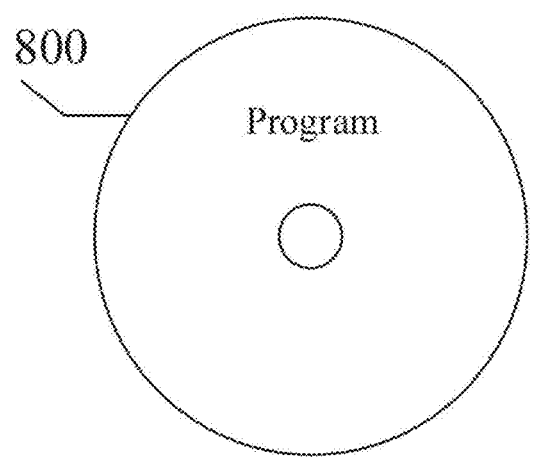
FIG. 5 is a schematic diagram of a program product in an exemplary embodiment of the present disclosure.

Referring to FIG. 5, a program product 800 for implementing the above method according to an embodiment of the present disclosure is described. The program product 800 can use a portable compact disc read-only memory (CD-ROM) and include the program code, which may run on a terminal device, for example, a personal computer. However, the program product of the present disclosure is not limited thereto. In this document, the readable storage medium may be tangible medium containing or storing programs, and the programs may be used by or used in combination with an instruction execution system, an apparatus, or a device.

The program product may employ any combination of one or more readable media. The readable medium may be a readable signal medium or a readable storage medium. The readable storage medium may be, for example, but not limited to, an electronic, magnetic, optical, electromagnetic, infrared, or semiconductor system, apparatus, or device, or any combination thereof. More specific examples (non-exhaustive list) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage devices, magnetic storage devices, or any suitable combination of the foregoing.

The computer-readable signal medium may include a data signal in a baseband or propagated as a part of a carrier wave, which carries readable program codes. Such a propagated data signal may take many forms, including but not limited to electromagnetic signals, optical signals, or any suitable combination of the foregoing. The readable signal medium may also be any readable medium other than a readable storage medium, and the readable medium may send, propagate, or transmit a program for use by or in combination with an instruction execution system, an apparatus, or a device.

The program code contained on the readable medium may be transmitted using any appropriate medium, including but not limited to wireless, wired, optical cable, RF, etc., or any suitable combination of the foregoing.

The program code for performing the operations of the present disclosure may be written in any combination of one or more programming languages, which include object-oriented programming languages, such as Java, C++, etc. and further include conventional procedural programming language, such as "C" or a similar programming language. The program code may be executed entirely or partly on the user computing device, may be executed as an independent software package, may be executed partly on the user computing device and partly on the remote computing device, or may be executed entirely on the remote computing device or server. In the case of involving remote computing devices, the remote computing devices may be connected to the user computing device via any kind of network, such as a local area network (LAN) or a wide area network (WAN), or it may be connected to external computing devices, for example, connected to external computing devices via the Internet by use of an Internet service provider.

In addition, the above-mentioned drawings are merely a schematic description

What is claimed is:

1. A method for generating a pedestrian flow funnel, comprising:
    obtaining a current frame image, and tracking and updating head-shoulder regions in a tracking sequence set in the current frame image according to a multi-target tracking algorithm;
    obtaining head-shoulder regions in the current frame image according to a head-shoulder recognition model, and updating the tracking sequence set according to the head-shoulder regions in the current frame image; and
    analyzing a motion trajectory of each head-shoulder region in the tracking sequence set to count pedestrians, and when the current frame image is a last frame image, generating the pedestrian flow funnel based on a counting result of the pedestrians,
    wherein tracking and updating head-shoulder regions in a tracking sequence set in the current frame image according to a multi-target tracking algorithm comprises:
    tracking and updating the head-shoulder regions in the tracking sequence set in the current frame image according to a kernel correlation filter tracking algorithm, respectively,
    wherein tracking and updating the head-shoulder regions in the tracking sequence set in the current frame image according to a kernel correlation filter tracking algorithm respectively comprises:
    obtaining candidate tracking targets corresponding to each head-shoulder region in the tracking sequence set in the current frame image based on a position of each head-shoulder region in the tracking sequence set in a previous frame image, respectively;
    correspondingly calculating response values of the candidate tracking targets corresponding to each head-shoulder region according to a tracker corresponding to each head-shoulder region, respectively;
    determining a candidate tracking target with a largest response value among the candidate tracking targets corresponding to each head-shoulder region as a tracking target of the corresponding head-shoulder region in the current frame image; and
    correspondingly updating each head-shoulder region in the tracking sequence set according to the tracking target of each head-shoulder region in the current frame image.

2. The method for generating a pedestrian flow funnel according to claim 1, before obtaining a current frame image, the method further comprises:
    obtaining a first frame image, obtaining head-shoulder regions in the first frame image according to the head-shoulder recognition model, and initializing the tracking sequence set through the head-shoulder regions.

3. The method for generating a pedestrian flow funnel according to claim 2, wherein generating the pedestrian flow funnel based on a counting result of the pedestrians comprises:
    generating the pedestrian flow funnel based on the counting result of the pedestrians and in combination with the age groups and gender of each head-shoulder region in the tracking sequence set.

4. The method for generating a pedestrian flow funnel according to claim 1, wherein the method further comprises:
    identifying age groups and gender of each head-shoulder region in the tracking sequence set according to a gender-age recognition model.

5. The method for generating a pedestrian flow funnel according to claim 4, wherein the method further comprises: constructing the gender-age recognition model, comprising:
    obtaining a third training sample set marking gender and age in a LFW dataset and a social network site; and
    training a gender-age network by using the third training sample set to obtain the gender-age recognition model, wherein the gender-age network comprises three convolutional layers and three fully connected layers.

6. The method for generating a pedestrian flow funnel according to claim 1, wherein the method further comprises: calculating the tracker corresponding to each head-shoulder region, comprising:
    obtaining a first training sample set corresponding to each head-shoulder region in the tracking sequence set in the previous frame image based on the position of each head-shoulder region in the tracking sequence set in the previous frame image, respectively; and
    training a regression model according to the first training sample set corresponding to each head-shoulder region respectively, to obtain the tracker corresponding to each head-shoulder region.

7. The method for generating a pedestrian flow funnel according to claim 1, wherein the method further comprises: generating the head-shoulder recognition model according to a convolutional neural network, comprising:
    training a MobileNet network according to an ImageNet categorical dataset to obtain a weight value of the MobileNet network;
    adding convolutional layers with a preset number of layers above the MobileNet network to obtain a head-shoulder detection network, wherein a size of the convolutional layers decreases layer by layer; and
    obtaining a second training sample set marked with the head-shoulder regions, and training the head-shoulder detection network retaining the weight value of the MobileNet network according to the second training sample set, to obtain the head-shoulder recognition model.

8. The method for generating a pedestrian flow funnel according to claim 1, wherein updating the tracking sequence set according to the head-shoulder regions in the current frame image comprises:
   calculating similarity between each head-shoulder region in the current frame image and each head-shoulder region in the tracking sequence set; and
   updating the tracking sequence set according to the similarity.

9. The method for generating a pedestrian flow funnel according to claim 8, wherein calculating similarity between each head-shoulder region in the current frame image and each head-shoulder region in the tracking sequence set comprises:
   calculating similarity between each head-shoulder region in the current frame image and each head-shoulder region in the tracking sequence set according to a following equation:

$$sim(Q_i, Q_j) = \frac{Q_i\text{area} \cap Q_j\text{area}}{Q_i\text{area} \cup Q_j\text{area}}$$

wherein, $sim(Q_i, Q_j)$ is similarity between the i-th head-shoulder region $Q_i$ the current frame image and the j-th head-shoulder region $Q_j$ in the tracking target set, $Q_i^{area}$ is an area of the i-th head-shoulder region $Q_i$ in the current frame image, and $Q_j^{area}$ is an area of the j-th head-shoulder region $Q_j$ in the tracking sequence set.

10. The method for generating a pedestrian flow funnel according to claim 8, wherein updating the tracking sequence set according to the similarity comprises:
    matching each head-shoulder region in the current frame image with each head-shoulder region in the tracking sequence set according to the similarity and a similarity threshold, respectively;
    if the matching successes, replacing the head-shoulder region in the tracking sequence set with the matched successfully head-shoulder region in the current frame image;
    if the matching fails, adding the matched unsuccessfully head-shoulder region in the current frame image to the tracking sequence set.

11. The method for generating a pedestrian flow funnel according to claim 10, wherein replacing the head-shoulder region in the tracking sequence set with the matched successfully head-shoulder region in the current frame image comprises:
    calculating a confidence of the matched successfully head-shoulder region in the current frame image and a confidence of a corresponding head-shoulder region in the tracking sequence set, respectively;
    when the confidence of the matched successfully head-shoulder region in the current frame image is greater than the confidence of the corresponding head-shoulder region in the tracking sequence set, replacing the head-shoulder region in the tracking sequence set with the matched successfully head-shoulder region in the current frame image correspondingly.

12. The method for generating a pedestrian flow funnel according to claim 11, wherein a calculation equation of the confidence is:

$$conf(obj) = \alpha * \frac{B}{\text{area}(obj)} + (1 - \alpha) * \text{Score}(obj)$$

wherein, $conf(obj)$ is the confidence of obj, obj is the head-shoulder region in the current frame image or the head-shoulder region in the tracking sequence set, $area(obj)$ is an area of obj, and $Score(obj)$ is a class belonging probability of obj calculated by the head-shoulder recognition model, and $\alpha$ is 0.5, and B is 1000.

13. The method for generating a pedestrian flow funnel according to claim 10, wherein before analyzing a motion trajectory of each head-shoulder region in the tracking sequence set to count the pedestrians, the method further comprises:
    when a head-shoulder region in a tracking state not updated by the head-shoulder regions obtained from each frame image in images with a first preset number of frames exists in the tracking sequence set, changing the head-shoulder region not updated by the head-shoulder regions obtained from each frame image in the images with the first preset number of frames from the tracking state to an abnormal state; and
    when a head-shoulder region in the abnormal state not updated by the head-shoulder regions obtained from each frame image in images with a second preset number of frames exists in the tracking sequence set, deleting the head-shoulder region in the abnormal state in the tracking sequence set that has not been updated by the head-shoulder regions obtained from each frame image in the images with the second preset number of frames.

14. The method for generating a pedestrian flow funnel according to claim 1, wherein analyzing a motion trajectory of each head-shoulder region in the tracking sequence set to count the pedestrians comprises:
    analyzing the motion trajectory of each head-shoulder region in the tracking sequence set; and
    counting the pedestrians according to the motion trajectory of each head-shoulder region and in combination with a virtual counting line.

15. A device for generating a pedestrian flow funnel, comprising:
    a processor; and
    a memory for storing executable instructions of the processor;
    wherein, the processor is configured to execute:
    obtaining a current frame image, and tracking and updating head-shoulder regions in a tracking sequence set in the current frame image according to a multi-target tracking algorithm;
    obtaining head-shoulder regions in the current frame image according to a head-shoulder recognition model, and updating the tracking sequence set according to the head-shoulder regions in the current frame image; and
    analyzing a motion trajectory of each head-shoulder region in the tracking sequence set to count pedestrians, and when the current frame image is a last frame image, generating the pedestrian flow funnel based on a counting result of the pedestrians,
    wherein, the processor is further configured to execute:
    tracking and updating the head-shoulder regions in the tracking sequence set in the current frame image according to a kernel correlation filter tracking algorithm, respectively, obtaining candidate tracking targets corresponding to each head-shoulder region in the tracking sequence set in the current frame image based on a position of each head-shoulder region in the tracking sequence set in a previous frame image, respectively;

correspondingly calculating response values of the candidate tracking targets corresponding to each head-shoulder region according to a tracker corresponding to each head-shoulder region, respectively;

determining a candidate tracking target with a largest response value among the candidate tracking targets corresponding to each head-shoulder region as a tracking target of the corresponding head-shoulder region in the current frame image; and correspondingly updating each head-shoulder region in the tracking sequence set according to the tracking target of each head-shoulder region in the current frame image.

16. A non-transitory computer-readable storage medium having a computer program stored thereon, wherein the computer program, when executed by a processor, implements the method for generating a pedestrian flow funnel according to claim 1.

\* \* \* \* \*